April 13, 1926.
M. O. REEVES
1,580,919
PULLEY
Filed April 13, 1923   2 Sheets-Sheet 1
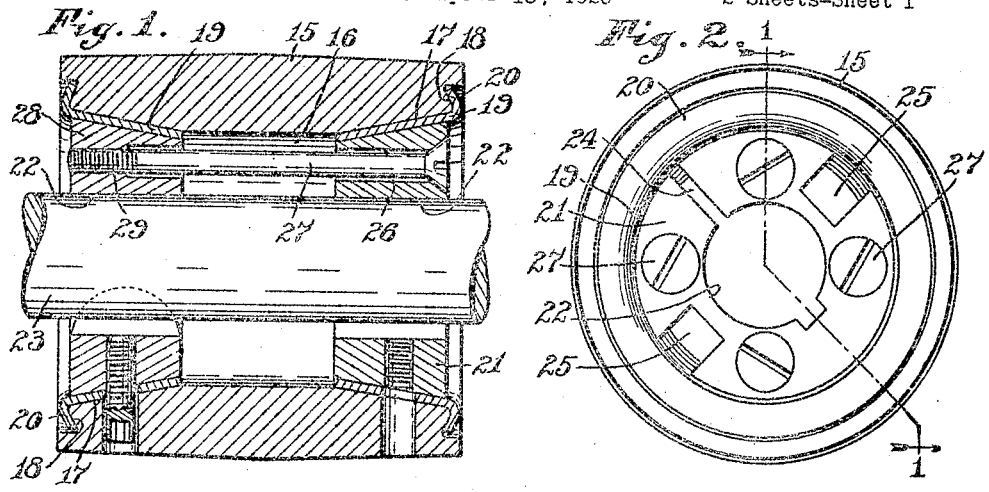
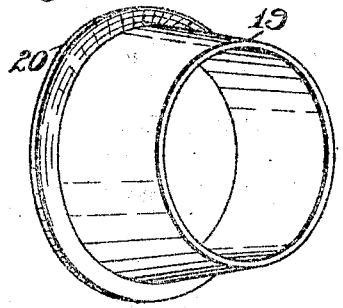
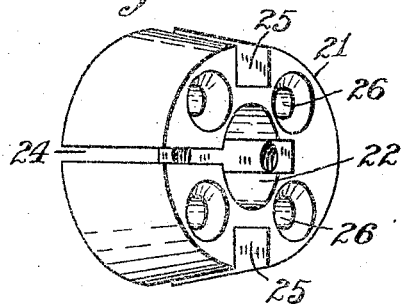
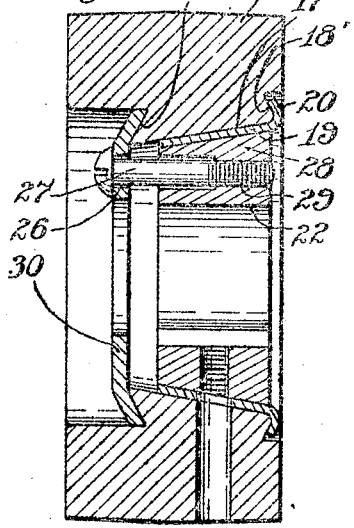
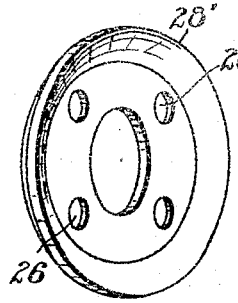
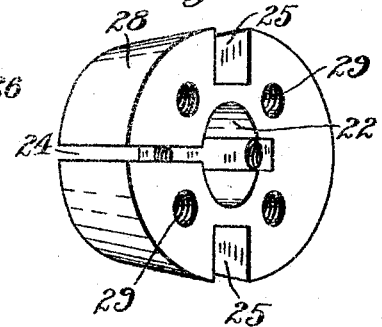
INVENTOR
Milton O. Reeves,
BY
Arthur M. Hood.
ATTORNEY April 13, 1926.
M. O. REEVES
PULLEY
Filed April 13, 1923     2 Sheets-Sheet 2
1,580,919
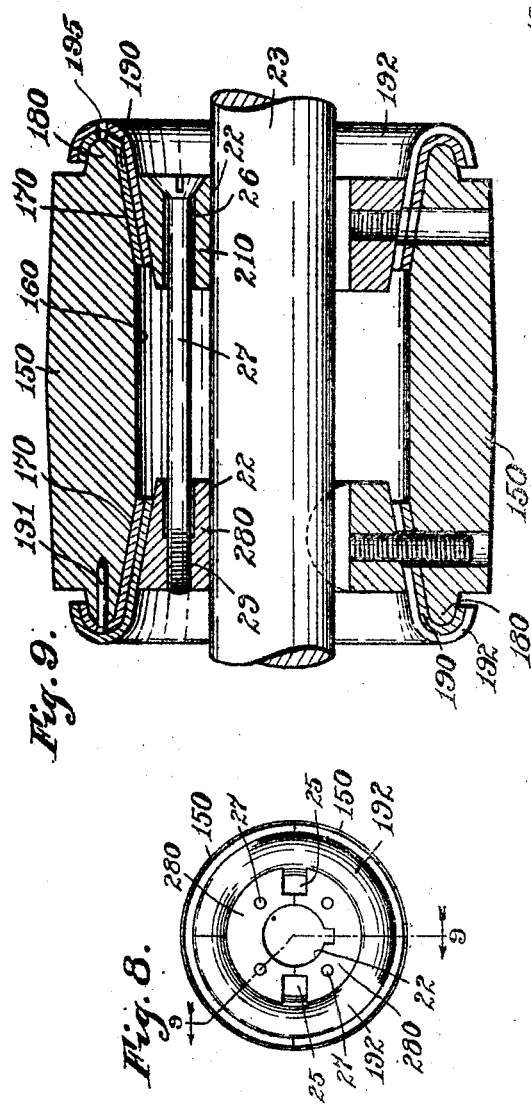
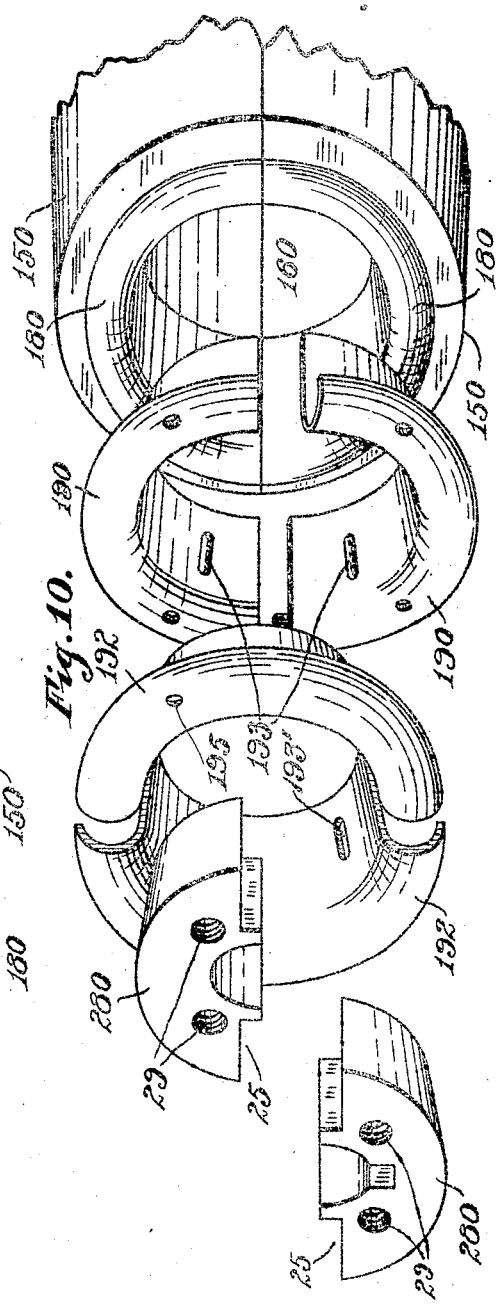
INVENTOR
Milton O. Reeves,
BY
Arthur M. Hood.
ATTORNEY Patented Apr. 13, 1926.

1,580,919

UNITED STATES PATENT OFFICE.

MILTON O. REEVES, OF COLUMBUS, INDIANA, ASSIGNOR TO REEVES PULLEY COMPANY, OF COLUMBUS, INDIANA, A CORPORATION OF INDIANA.

PULLEY.

Application filed April 13, 1923. Serial No. 631,771.

*To all whom it may concern:*

Be it known that I, MILTON O. REEVES, a citizen of the United States, residing at Columbus, in the county of Bartholomew and State of Indiana, have invented a new and useful Pulley, of which the following is a specification.

In the merchandising of pulleys, particularly of the type having non-metallic belt receiving surfaces, it is necessary for the dealer, in order to supply his trade promptly, to carry in stock a considerable quantity of pulleys of varying diameters, faces and bores.

One of the objects of my present invention is to provide a pulley structure of such character that pulley bodies of varying diameters and faces may be readily equipped with bores of any desired size, thereby reducing to a minimum the stock necessary to promptly fill the universal demand.

A further object of my invention is to provide a pulley structure, of the character mentioned above, having a minimum amount of non-metallic portion and, in that connection, to provide means by which such non-metallic portions may be maintained, while in storage, in cylindrical condition.

A further object of my invention is to provide a split pulley construction having the above mentioned characteristics.

A further object of my invention is to provide a pulley structure of such character that it may be readily securely attached to a shaft in any position and may be as readily detached.

Further objects of my invention will appear from the description and it will be readily understood that the particular forms shown in the drawings are only illustrative; and that various modifications may be made without departing from the spirit of my invention; and that, while the drawings illustrate pulleys of relatively small diameters, the invention may, by obvious modifications, be readily applied to pulleys of relatively larger diameters.

The accompanying drawings illustrate my invention: Fig. 1 is an axial section of a solid pulley embodying my invention, on line 1—1 of Fig. 2; Fig. 2 an end elevation of the parts shown in Fig. 1; Fig. 3 a perspective view of one of the thimbles; Fig. 4 a perspective view of one of the bushings; Fig. 5 a perspective of the bushing shown in Fig. 6; Fig. 6 an axial section of a form of pulley in which but one bushing is used; Fig. 7 a perspective of the clamping plate shown in Fig. 6; Fig. 8 an end elevation of a split pulley embodying my invention; Fig. 9, a section on line 9—9, of Fig. 8, on a larger scale and Fig. 10 a perspective view of one end of the pulley shown in Fig. 9, together with the various elements associated with that end.

In the drawings, Figs. 1 to 4 inclusive, 15 indicates the main body of a wooden or other similar pulley provided with a bore 16 the diameter of which is enough larger than the largest shaft with which the pulley is expected to co-operate, to permit the introduction of the parts to be described. At its opposite ends bore 16 is outwardly flared, as indicated at 17 and, at the outer end of each flared portion the pulley is preferably undercut, as indicated at 18. Arranged in each outwardly flared portion 17 is a tapered thimble 19 provided at its outer end with a flange 20 flared toward the smaller end of the thimble so as to form, by co-action with the undercut surface 18, an interlocking engagement with the body 15.

Preferably, the thimbles 19 are secured in the pulley body at the factory, conveniently by a suitable adhesive, or by fastening members, so that they will serve as reinforcements for the pulley body, during storage, to prevent distortion by warping, variable shrinkage, etc.

21 indicates any one of a series of bushings having a tapered exterior fitting the internal taper of sleeve 19 and having a bore 22 of proper size to fit, by a sliding fit, a selected shaft 23. Bushing 21 is split at 24, in order that it may be compressed so as to be clamped upon shaft 23 and is preferably provided with one or more longitudinal slots 25 in its external surface the purpose of which will appear. Bushing 21 is provided with a plurality of longitudinal perforations 26 through which clamping screws 27, parallel with shaft 23, may be projected.

Co-operating with screws 27 is a bushing 28, similar to bushing 21 and provided with perforations 29 threaded to receive the threads of screws 27.

The dealer, carrying a stock of pulley bodies 15 of variable diameters and faces, but of substantially uniform bores 16, and a stock of bushings of uniform exteriors and varying bores, will be equipped, with a minimum stock, to supply a demand of maximum variability.

With any shaft having a free end, a proper bushing 28 may be slipped in place, a pulley placed thereon, a bushing 21 inserted in the outer end of the pulley, and the two bushings be drawn together so as to be tightened upon the shaft and into the pulley, by manipulation of screws 27, the thimbles taking the wedging strain off the pulley. Whenever it is desired to remove the pulley, screws 27 are loosened. The taper of the sleeves 19 and the bushings 21 and 28 is preferably so small that the bushings will stick within the sleeve. When screws 27 are loosened, bushings 28 may be driven out of the thimble 19 by tapping on screws 27 or by introducing a drift through openings 25 and engaging bushing 28. As soon as this is accomplished, pulley 15 will then be tapped so as to be driven axially toward the retracted bushing 28 and away from the bushing 21, which remains clamped upon the shaft until the pulley is loosened therefrom.

In the form shown in Figures 5 and 6, the pulley body 15' is provided with a tapered bore 17' and undercut portions 18' and 18" at the ends of said tapered bore. A thimble 19 is placed in this tapered bore, in the manner already described, and said thimble receives a bushing 28 having threaded perforations 29, receiving clamping screws 27 which pass through the abutment or clamping plate 30 having a flaring perimeter co-acting with the undercut surface 18".

In Figs. 8 to 10 inclusive I show an adaptation of my invention to split pulleys. The body of the pulley is composed of two mating sections 150, 150 having bore 160 outwardly flared at its ends, as indicated at 170, having annular ribs 180 at their outer ends. Fitting surfaces 170 and ribs 180 are semi-annular tapered sleeves 190 which are co-extensive with the semi-annular body sections 150, preferably, and are preferably secured in place by suitable adhesive or by fastening members 191.

Nesting in the thimbles 190 are semi-annular tapered thimbles 192 which are placed so as to break joints with the thimbles 190. The thimbles 190 are provided with struck up projections 193 which take into corresponding recesses 193' in the thimbles 192 and thus provide mating angularly-interlocking portions to insure proper relative placing and to circumferentially lock them from sliding under the expansive force of the tapered bushing.

The interiors of thimble sections 192 are formed to receive split bushing sections 210 and 280 corresponding to bushings 21 and 28 in Fig. 1.

By attaching the thimble sections 190 to the body sections 150, by adhesive or otherwise, in the manner described, the body sections will be held in shape during storage, so that, when they are finally assembled upon a shaft, an efficient pulley will be produced.

For purposes of assembly on the shaft it has been found convenient to provide the flanges of the thimbles 190 and 192 with perforations 195, as indicated at the upper right hand corner of Fig. 9 and, after the parts are initially assembled on the shaft, to drive the fastening member 191 through these perforations into the body of the pulley. Of course, these elements when so placed form substantial radial interlocks between the parts.

I claim as my invention:

1. A pulley comprising a main non-metallic body having a bore, a strain receiving thimble having a conical interior mounted in said bore and having radial interlocking engagement with the pulley body by means of an under-cut portion of the body and a mating flange on the thimble, a compressible bored bushing having an exterior mating with the conical interior of the thimble, clamping screws arranged axially of the pulley and co-operating with the bushing to produce relative axial movement between the bushing and thimble and an abutment for said clamping screws co-acting with the pulley.

2. A pulley comprising a main bored non-metallic body, a pair of strain receiving thimbles mounted in the ends of the bore provided with end flanges having a radial interlocking engagement with the pulley body and having inwardly tapered interiors, a pair of compressible externally tapered bored bushings mounted in said thimbles and clamping screws extending axially of the body and co-acting with said bushings to draw the same toward each other.

3. A pulley comprising a main bored non-metallic body, a pair of strain receiving thimbles externally and internally tapered mounted in the ends of said bores and provided with end flanges having a radial interlocking engagement with the pulley body, said bores being tapered to correspond with the external taper of said thimbles, a pair of compressible externally tapered bored bushings mounted in said thimbles and clamping screws extending axially of the body and co-acting with said bushings to draw the same together.

4. A split pulley comprising mating bored body sections, mating thimble sections arranged in said bore, a second set of mating thimble sections in break joint relation thereto nested in the first mentioned thimble sections and forming a tapered bore, mating bushing sections in break joint relation thereto externally tapered and nested in the last mentioned thimble sections, clamping screws acting upon said bushing sections to produce relative axial movement between said bushing sections and thimble sections, and an abutment for said screws co-acting with body sections.

5. A split pulley comprising mating bored body sections, mating thimble sections arranged in said bore, a second set of mating thimble sections nested in the first mentioned thimble sections in break joint relation thereto and forming a tapered bore, a radial interlock formed between the body sections and one set of thimble sections, mating bushing sections externally tapered and nested in the second set of thimble sections, clamping screws acting upon said bushing sections to produce relative axial movement between bushing sections and thimble sections and an abutment for said screws co-acting with the body sections.

6. A split pulley comprising bored body sections, thimble sections arranged in said bore, a second set of mating thimble sections in the first mentioned thimble sections in break joint relation thereto and forming a tapered bore, said thimble sections being tapered both externally and internally and the bore of the pulley body sections being correspondingly tapered, mating bushing sections externally tapered and nested in the second set of thimble sections, clamping screws acting upon said bushing sections to produce relative axial movement between said bushing sections and thimble sections and an abutment for said screws co-acting with said body sections.

7. A split pulley comprising mating bored body sections, mating thimble sections arranged in each end of said bore, a second set of mating thimble sections nested in each set of the first mentioned thimble sections in break joint relation thereto and forming a tapered bore, mating bushing sections externally tapered and mounted in each of the last mentioned sets of thimble sections, and clamping screws co-acting with the two sets of bushing sections to draw the same together.

8. A split pulley comprising mating bored body sections, mating thimble sections arranged in each end of said bore, a second set of mating thimble sections nested in each set of first mentioned thimble sections in break joint relation thereto and forming a tapered bore, a radial interlock between the body sections and the thimble sections, mating bushing sections externally tapered and mounted in each of the last mentioned sets of thimble sections and clamping screws co-acting with the two sets of bushing sections to draw the same together.

9. A split pulley comprising mating bored body sections, mating thimble sections arranged in each end of said bore, a second set of thimble sections nested in each set of the first mentioned thimble sections in break joint relation thereto and forming a tapered bore, said thimble sections being externally and internally tapered, mating bushing sections externally tapered and mounted in each of the second set of thimble sections and clamping screws co-acting with the two sets of bushing sections to draw the same together.

10. A split pulley comprising mating bored body sections, mating thimble sections arranged in each end of said bore, a second set of mating thimble sections nested in each set of the first mentioned thimble sections in break joint relation thereto and forming a tapered bore, said sections being radially interlocked with the body sections and with each other, mating bushing sections externally tapered and mounted in each of the last mentioned sets of thimble sections and clamping screws co-acting with the two sets of bushing sections to draw the same together.

11. A split pulley comprising mating bored body sections, mating thimble sections internally tapered and arranged in said bore to radially interlock with the body sections, mating bushing sections externally tapered and nested in said thimble sections, clamping screws acting upon said bushing sections to produce relative axial movement between said bushing sections and the thimble sections, and an abutment co-acting with said screws and body sections.

12. A split pulley comprising mating bored body sections, mating thimble sections internally and externally tapered and arranged in said bore to radially interlock with the body sections, the body section bores being correspondingly tapered to correspond with the external taper of the thimble sections, mating bushing sections externally tapered and nested in said thimble sections, clamping screws acting upon said bushing sections to produce relative axial movement between said bushing sections and the thimble sections and an abutment co-acting with said screws and body sections.

13. A split pulley comprising mating bored body sections, mating thimble sections internally tapered and arranged in each end of said bore to radially interlock with the body sections, mating bushing sections externally tapered and nested in said thimble sections, and clamping screws acting upon said bushing sections to produce relative axial movement between the bushing sections and the adjacent thimble sections.

14. A split pulley comprising mating bored body sections, mating thimble sections internally and externally tapered and arranged in each end of said bore to radially interlock with the body sections, the bore of the body sections being tapered to correspond with the external taper of the thimble sections, mating bushing sections externally tapered and nested in said thimble sections and clamping screws acting upon said bushing sections to produce relative axial movement between the bushing sections and the adjacent thimble sections.

15. A split pulley comprising mating bored body sections, mating thimble sections arranged in said bore, a second set of mating thimble sections nested in the first mentioned thimble sections in break joint relation thereto and forming a tapered bore, the two sets of thimble sections being circumferentially interlocked, mating bushing sections externally tapered and nested in the second set of thimble sections, clamping screws acting upon said bushing sections to produce relative axial movement between said bushing sections and thimble sections and an abutment for said screws co-acting with body sections.

16. A split pulley comprising mating bored body sections, mating thimble sections arranged in said bore, a second set of mating thimble sections nested in the first mentioned thimble sections in break joint relation thereto and forming a tapered bore, a radial interlock formed between the body sections and one set of thimble sections and the thimble sections being circumferentially interlocked, mating bushing sections externally tapered and nested in the second set of thimble sections, clamping screws acting upon said bushing sections to produce relative axial movement between said bushing sections and thimble sections and an abutment for said screws co-acting with body sections.

17. A split pulley comprising mating bored body sections, mating thimble sections arranged in each of said bores, a second set of mating thimble sections nested in each set of the first mentioned thimble sections in break joint relation thereto and forming a tapered bore, said sets of thimble sections being circumferentially interlocked, mating bushing sections externally tapered and mounted in each of the second set of thimble sections and clamping screws co-acting with the two sets of bushing sections to draw the same together.

18. A pulley comprising a main body having a bore with tapered ends, a pair of externally tapered bushings fitting the tapered ends of the body bore, and means for drawing said bushings toward each other into the tapered ends of the body bore, one of said bushings being longitudinally perforated by a perforation to permit the insertion of the driving tool therethrough and into engagement with the opposite bushing.

19. A pulley comprising a main body having a bore with tapered ends, a pair of externally tapered compressible bushings fitting the tapered ends of the body bore, and means for drawing said bushings toward each other into the tapered ends of the body bore, one of said bushings being longitudinally perforated by a perforation to permit the insertion of the driving tool therethrough and into engagement with the opposite bushing.

In witness whereof, I have hereunto set my hand at Indianapolis, Indiana, this 5th day of April, A. D. one thousand nine hundred and twenty three.

MILTON O. REEVES.